United States Patent [19]

Foster

[11] Patent Number: 5,240,766
[45] Date of Patent: Aug. 31, 1993

[54] GASKET MATERIAL

[75] Inventor: Richard P. Foster, Norwood, Mass.

[73] Assignee: Hollingsworth & Vose Company, East Walpole, Mass.

[21] Appl. No.: 861,477

[22] Filed: Apr. 1, 1992

[51] Int. Cl.$^5$ .............................................. B04H 1/08
[52] U.S. Cl. ................................... 428/280; 428/283; 428/284; 524/34; 524/16; 524/35
[58] Field of Search ....................... 428/280, 283, 284; 524/2, 16, 34, 35, 369; 264/109

[56] References Cited

U.S. PATENT DOCUMENTS

| | | | |
|---|---|---|---|
| 3,742,176 | 6/1973 | Ishino et al. | 210/10.55 |
| 4,330,442 | 5/1982 | Lindeman et al. | 524/16 |
| 4,443,517 | 4/1984 | Shah | 428/283 |
| 4,529,653 | 7/1985 | Hargreaves et al. | 428/450 |
| 4,529,663 | 7/1985 | Lancaster et al. | 428/450 |
| 4,544,708 | 11/1985 | Moggi et al. | 525/337 |
| 4,550,132 | 11/1985 | Capriotti | 524/84 |
| 4,692,291 | 9/1987 | Angell, Jr. | 264/120 |
| 4,694,045 | 9/1987 | Moore | 525/276 |
| 4,785,148 | 11/1988 | Mayer | 219/10.55 |
| 4,786,670 | 11/1988 | Tracey et al. | 524/34 |
| 4,833,212 | 5/1989 | Yamada et al. | 529/359 |
| 4,859,526 | 8/1989 | Potepan et al. | 428/283 |
| 4,952,634 | 8/1990 | Grossman | 525/190 |
| 4,977,205 | 12/1990 | Bauer et al. | 524/496 |
| 4,983,688 | 1/1991 | Jennings et al. | 525/389 |
| 4,996,264 | 2/1991 | Aohuma et al. | 525/179 |
| 5,057,566 | 10/1991 | Kobayashi et al. | 524/297 |
| 5,074,963 | 12/1991 | Muse et al. | 162/158 |
| 5,098,777 | 3/1992 | Koli | 428/283 |

Primary Examiner—Patrick J. Ryan
Assistant Examiner—N. Edwards
Attorney, Agent, or Firm—Lahive & Cockfield

[57] ABSTRACT

A composite gasket material includes a fiber component (3-15% by wt.), an elastomeric binder component (3-15% by wt.), and a solid filler component (60-90% by wt.). The material may additionally include a phenolic or epoxy resin (up to 5 wt. %) and a silicone resin (up to 5 wt. %). The filler includes as a component a salt formed from a multivalent metal cation and a sterically hindered dicarboxylic acid. The salt ingredient typically comprises from about 20 to 80 wt. % of the filler. Gaskets made from this composite material exhibit improved sealability and thermal stability while retaining other desirable mechanical properties. These materials are able to withstand operating temperatures up to about 450° C.

17 Claims, No Drawings

GASKET MATERIAL

BACKGROUND OF THE INVENTION

The invention relates to a composition having high thermal stability and good sealability properties. More particularly, the invention relates to improved gasket materials.

Gaskets and other seals are required for use in many applications where adjacent surfaces are to be sealed to prevent fluid or gas leakage. One application where gaskets are particularly important are as head gaskets for automobile engines.

A variety of materials are used in gasket manufacture. Among the different types of gasket materials are composite gasket materials made by a wet laid process (often known as Beater Addition gasket material), expanded graphite gasket materials, and multilayer steel gasket materials.

Expanded graphite gasket materials are comprised of expanded graphite flake which may contain a small amount (1.0% or less) of a polymeric resin such as phenolic resin or polyvinyl alcohol, serving as binder material. These gasket materials can be rather expensive and are effective at relatively high operating temperatures, up to about 550° C. However, one disadvantage of these materials is their low resistance to compressive forces, especially after exposure to fluids such as oil or antifreeze.

Multilayer steel gasket materials are made of multiple layers steel, both flat and embossed, and may include a coating such as fluorine, silicone, epoxy, or nitrile butadiene rubber. These gasket materials are intended for harsh environments and may be used at operating temperatures above about 550° C. A drawback of such materials is that they require excessively smooth and expensive joint surfaces.

Composite gasket materials made by a wet laid process (Beater Addition gasket materials) are comprised of a fiber component which is distributed within an elastomeric binder matrix, together with property improving solid fillers. These materials may be modified by silicone saturation to improve their thermal and sealability properties. Moreover, these materials may be used alone as "soft" gasket materials for some applications, or they may be laminated to steel, forming "hard" gasket materials for other applications. The maximum operating temperature at which these gasket materials normally may be used is between about 200° C. and 250° C.

Some gasket applications, particularly for use as automobile head gaskets, use Beater Addition gasket material. This type of gasket, as noted above, includes a fiber component and a filler dispersed in an elastomeric binder matrix. The fiber can include various synthetic or mineral fibers which help to improve processability of the material. The binder is generally a polymeric elastomer which provides a matrix to secure the other components which form the gasket. The filler includes solid materials such as kaolins, mica, graphites, diatomaceous earths and other such materials, which impart desirable mechanical properties to the composite material.

Beater Addition gasket materials are often used in harsh environments where they are subject to chemical solvents, to temperatures which often exceed 200° C., and to high pressures. As a result, the properties which these materials must exhibit include crush resistance, chemical resistance, thermal stability and suitable sealing properties. To some extent, the properties can be varied by adjusting the ratios of fiber, binder and filler. Typically, an increase in the amount of the binder component improves sealability, but usually at the expense of the heat stability. Similarly, a decrease in the binder content compromises the sealability while improving the heat stability. While the alternative gasket materials, such as expanded graphite and multilayered steel, tend to provide good thermal stability as well as good sealing properties, the cost of these materials is extremely high and may be prohibitively high for some applications. Moreover, both the expanded graphite and multilayered steel gasket materials have their associated drawbacks mentioned above.

There is thus a need for a Beater Addition gasket material which has improved thermal stability and sealing properties.

Accordingly, it is an object of the invention to provide a Beater Addition gasket material which combines high thermal stability with good sealability properties and good chemical resistance. It is also an object to provide such a gasket material which retains high resistance to compression forces after exposure to fluids and which is able to seal joints having somewhat rough flange surfaces. Another object of the invention is to provide an economical gasket material with superior properties. A further object of the invention is to provide a gasket material suitable for use as an automobile head gasket. Other objects will be apparent to those having ordinary skill in the art upon reading the invention disclosure which follows.

SUMMARY OF THE INVENTION

The invention provides a composite-based gasket material, made from a wet laid process, which has improved thermal stability and sealability properties. This material may be used alone as a soft gasket, or may be laminated to steel or other reinforcing materials for use as a hard gasket. One desirable application of hard gasket materials is as head gaskets for automobile engines.

The composition comprises a fiber component which contributes processability and structural reinforcement to the composition and a filler component which provides desirable mechanical properties, such as sealability, thermal stability and crush resistance. Typically, the composition also includes a binder material, such as a polymeric elastomer, which serves as a matrix securing the fiber and filler components.

The fiber component typically is constructed from a fibrillated fiber having thermal stability at temperatures up to about 350° C. or higher. The fiber component can be a mineral fiber or a synthetic fiber, and it typically comprises from about 3 to 15% by weight of the total composition.

The filler component typically comprises about 60 to 90% by weight of the total composition. At least about 25% by weight (and most preferably about 35 wt. %) of the filler component comprises a salt of a multivalent metal cation and a sterically hindered dicarboxylic acid. Preferred metal cations are those which are divalent and include barium, cadmium, calcium, cobalt, magnesium, lead, nickel, strontium and zinc. The sterically hindered dicarboxylic acid is one which includes one or more large substituents, such as phenyl groups. Preferred sterically hindered dicarboxylic acids include terephthalic acid, and isophthalic acid. Other solid materials may comprise the balance of the filler component. These solids may include materials such as kaolins, mica, graphites, diatomaceous earths, vermiculite, and the like.

The elastomeric binder component preferably comprises about 3 to 15 percent by weight of the total composition. Suitable binders typically are synthetic materials including nitrile rubbers, hydrogenated nitrile rubbers, styrene butadiene rubbers, acrylonitrile/butadiene/styrene ("ABS") terpolymer, acrylic rubbers, and silicone rubbers. Generally, the elastomeric materials should be suitable for use in environments where the temperature will range between about 150° C. to 300° C. or more.

The composite gasket material may also include additional performance-improving additives which contribute chemical resistance to the composite. Such materials can include epoxy or phenolic resins at 1-5% by weight, in combination with silicone resins at 1-5% by weight.

DETAILED DESCRIPTION OF THE INVENTION

The invention comprises a composite gasket material which includes a fiber component and a filler component wherein at least about 25 percent by weight of the filler comprises a salt of a multivalent metal cation and a sterically hindered dicarboxylic acid. The filler component contributes desirable mechanical properties to the composite material and enables it to demonstrate sealability properties and thermal stability at temperatures at least as high as about 200° C. to 450° C. In addition, the composite preferably includes as a binder a polymeric elastomer which serves as a matrix to secure the fiber and filler components of the composite. Other polymeric resins may also be added to improve resistance to oils and antifreeze. The gasket material of this invention exhibits good sealability properties and thermal stability at temperatures as high as about 200° C. to 450° C. The gasket also demonstrates chemical resistance in that it resists degradation from fuels, oils, antifreeze, alcohols, diol and other solvents.

The fiber component is generally present at about 3 to 15% by weight of the entire composite material. The fiber material may be synthetic, natural or mineral. Examples of suitable synthetic and natural fibers include a variety of cellulosic fibers from wood pulp through cotton, Rayon, abacca (manila hemp), polyamide fibers, polyacrylonitrile fibers, acrylic fibers, polyimide fibers, polyaramid fibers, polyphenylene sulfide fibers, and polybenzimidazole fibers. Carbon fibers may be used as well, as may be mineral fibers such as glass and ceramic fibers. The cellulosic fibers, polyacrylonitrile fibers, and acrylic fibers are suitable for lower temperature applications, that is up to about 200° C. Fibers which are suitable for middle range temperature applications (i.e., about 200° C. to 300° C.) include the polyester fibers, polyamide fibers (e.g., Nylon 6, Nylon 66, Nylon 610), and polyphenylene sulfide fibers. Fibers suitable for high temperature applications (about 300° C. and above) include the polyimide fibers, polybenzimidazole fibers, carbon fibers, glass fibers and ceramic fibers.

Exemplary carbon fibers include pitch based fibers (e.g., CARBOFLEX, available from Ashland Chemical Co.) and carbon fibers which are formed from polyacrylonitrile fiber precursors. Various glass fibers can be used including JM glass fibers (available from Johns-Manville) and DE grade glass fiber. Suitable ceramic fibers include various "Fiberfax" fibers available from Standard Oil Engineered Materials Company, Fiber Division (formerly Carborundum Corporation) as EF 121, EF 111, EF 101, and HSA. These are ceramic fibers which comprise alumina, silica and various oxides such as boron oxide and calcium oxide.

Among the most preferred fibers of the composite material are the polyimide fibers, carbon fibers, polyamide fibers, polyaramid fibers, and ceramic fibers. Moreover, various combinations of fibers may be used as well. For instance, a combination of polyimide and carbon fibers may be used at a ratio of about 5:3 in favor of the polyimide fiber. Other combinations of fibers include a combination of aramid and ceramic fibers (5:3 ratio), a combination of aramid and mineral fibers (1:1 ratio), and a combination of aramid and mineral fibers at a 1:1 ratio.

Among the properties required of fibers suitable for use with the composite material of the invention are the need for appropriate thermal stability, chemical resistance, tensile strength, tear resistance, and some degree of compressive strength. In addition, the fibers should be fibrillated in that they must be formable into relatively short fibers of irregular shape, lacking linearity. Preferably, the fibers for use with the composite material of the invention have a length in the range of 200 microns to 0.25 inch, and a diameter of 1-15 microns. The aspect ratio of these fibers should generally be in the range of 5:1 to 40:1.

The filler component forms the major percentage of the composite material of the invention. As noted, the filler contributes desirable mechanical properties to the composite, including mechanical strength, thermal stability, crush resistance, sealability, and flexibility. The filler generally comprises about 60 to 90 percent by weight of the entire composite material. An important component of the filler is a salt of a multivalent metal cation and a sterically hindered dicarboxylic acid. The multivalent metal cation can be divalent, trivalent or tetravalent. Preferably the cation is divalent and may include metals such as barium, cadium, calcium, cobalt, magnesium, lead, nickel, strontium, and zinc. Preferred metal cations include barium, calcium, magnesium and zinc. The sterically hindered dicarboxylic acid is one which includes large substituents such as phenyl groups. Examples of suitable sterically hindered dicarboxylic acids include terephthalic, isophthalic acids, tetrafluoro terephthalic acid, and 1,4 dicarboxy napthalene. Among the most preferred salts are calcium terephthalate, calcium isophthalate, barium terephthalate, barium isophthalate, zinc terephthalate, zinc isophthalate, magnesium terephthalate, and magnesium isophthalate.

The salt comprises at least about 20 to 80 percent by weight of the filler component. Most preferably, the salt is present at about 30 to 60% by weight of the filler component.

The salt is an important component of the filler. When such materials are included within a gasket material they provide excellent electrical and thermal insulating properties. Among the attributes of these compounds is that they contribute to good sealability properties, have high decomposition temperatures, generally above 600° C., and they are not prone to melting at temperatures below their decomposition temperature. This property contributes good stress relaxation since no flow or change in volume occurs below the decomposition temperature of the compound. In addition, these salts can be made into needle-like shapes with an irregular shape with aspect ratios in the range of 5:1 to 20:1 and diameters in the range of 1 to 5 microns. This shape contributes resistance to crush while still maintaining lubricity. In addition, the salt compound, such as calcium terephthalate, calcium isophthalate, barium terephthalate, and barium isophthalate, has excellent resistance to chemical solvents, acids, bases, oils, fuels, water and antifreeze. This is an important feature of any material such as a gasket, which is used in environments where it is exposed to many different fluids and which must resist breakdown during its operating lifetime.

Perhaps most importantly, the salt filler material contributes excellent sealability for gasket applications. In many gasket materials, the seal can be enhanced by including fillers, such as platey fillers, graphite flake, vermiculite bentonites, and calcined attapulgates. Alternatively, seal can be improved by using organic binders such as nitrile butadiene rubber, styrene butadiene rubber, acrylic or butyl rubbers. However, using either of these approaches to improve the sealability often results in some degree of a loss in other desirable properties such as crush resistance, stress relaxation and machine processability. Compressibility, swell and absorption can also be compromised.

Use of these metal salts as a filler component is advantageous in that it eliminates the need to use platey fillers and reduces the need to use high levels of organic binder in order to enhance seal, especially against polar fluids. Thus, several commonly used formulation components can be eliminated while still obtaining improved sealability without sacrificing physical properties. In addition, use of this salt as a filler can reduce the level of binder material needed to form a suitable gasket material.

A number of salts, including calcium terephthalate, zinc terephthalate, and magnesium terephthalate, are believed to be well suited to crosslinking with polymers having pendent carboxyl groups. It is believed that binder polymers such as carboxylated styrene butadiene rubbers, acrylics, and nitrile butadiene rubbers will react with divalent metal ion donors to form ionic crosslinks at typical drying temperatures used in the gasket preparation process. The crosslinking of these salts with polymers used in the binder can help improve the overall strength of the materials.

In addition to the salt component of the filler, the balance of the filler may include other solid materials including aluminum trihydrate, attapulgates, clays, kaolins, mica, vermiculite, graphite, diatomaceous earths, alumina, zinc borate, and magnesium hydroxide. Among the most preferred solid additives to the filler are non-platey kaolins, hydrated alumina, magnesium hydroxide, and mica. Generally, one or more solid particles are used to form the filler material, however a single solid material such as kaolin may be used.

Platey fillers contribute tensile strength, good sealability properties, and good compressibility properties to the gasket material. Other filler shapes (i.e., non-platey) contribute to improved stress relaxation and improved compressive strength. The particle sizes of the fillers used to form the gasket material range from less than 1 micron to 100 microns. The majority of particles are in the size range of about 20 microns.

As noted above, the incorporation of the divalent metal salt of a dicarboxylic acid into the filler component generally will eliminate the need to increase binder levels above about 3-6% by wt. in order to obtain the desired sealability. More generally, the binder can be present at a range of about 3 to 15% by weight of the entire composite.

The binder component preferably is a polymeric elastomer. Examples of polymeric elastomers which may be included in the composite material include acrylonitrile-butadiene-styrene rubbers (ABS), nitrile rubbers (such as nitrile butadiene rubber and hydrogenated nitrile butadiene rubbers), butyl rubbers, polybutadiene, polyisoprene, terpolymers of ethylene, propylene and conjugated diene (EPDM), natural rubbers, styrene butadiene rubber, acrylic rubbers and silicone rubbers. The silicone rubbers and the nitrile rubbers are generally useful for high temperature applications as structures comprised thereof do not break down at temperatures up to about 350° C. The acrylic, butyl, and EPDM rubbers are generally useful for intermediate temperature range applications, i.e., up to about 300° C. The styrene butadiene, polybutadiene, polyisoprene and natural rubbers are more useful for applications where the temperature is not likely to exceed 250° C.

Suitable elastomers used to form the binder component of the gasket material should contribute to the gasket material properties such as tensile strength and flexibility. Moreover, these materials should have the ability to withstand degradation from the fluids and at the temperature at which they will be exposed. The environment within which a given gasket material is expected to operate will largely determine the type of elastomer which can be used in the formation of the gasket material.

The composite material may also include polymeric materials such as phenolic and/or epoxy resins which serve as a reinforcing thermoset resins. These materials are also useful in that they contribute chemical resistance to the composite, particularly the ability to perform in environments which contain oils and antifreeze. The incorporation of this material at ranges of about 5 wt. percent or less, and preferably at about 1 to 2 wt. percent, contribute to improved thermal stability and improved resistance to water, oils, and antifreeze. Another useful additive is a silicone resin. This is a hydrophobe which repels water and thus also contributes to chemical resistance, particularly resistance to oils and antifreezes. This additive may be included at ranges up to about 5 wt. %, and preferably at about 1 to 2 wt. %.

The composite material of the invention can be manufactured by known techniques for preparing Beater Addition gasket materials. The wet laid process well known in the paper making industry is one technique which is suitable for making such materials.

The composite material of the invention can be used as a soft gasket material, where it is used alone without reinforcement. Soft gasket materials are generally suitable for low temperature applications, that is temperatures not exceeding 250° C. Soft gaskets may be used in applications including water pumps, pipe flanges, transmission housings, and rear differential housings. The material may also be used to form hard gaskets, such as the type used in automobile head gaskets. Hard gaskets are formed by laminating the composite of the invention to a reinforcing material such as a steel. The steel may be a solid sheet or may be a sheet of steel having perforations in a desired pattern. The steel reinforcement material may form a core with the composite mounted on either side of the steel reinforcement material. Alternatively, the composite material may form the core, sandwiched between sheets of steel reinforcement.

A variety of formulations may be used to manufacture a suitable composite gasket material according to the invention. Generally the desired gasket application (i.e., low, intermediate or high temperature) will determine the most preferred fiber and binder to be used. The divalent metal salt of a dicarboxylic acid is a necessary component, but the specific salt can be determined based upon the properties required of a gasket material. Similarly, the choice of solid fillers to be used will depend upon the properties required of a given material and can readily be determined by one of ordinary skill in the art.

Exemplary composite formulations are described below.

the percentages of the components illustrated in the Table. In addition, the identity of various components may be altered. In particular, the calcium terephthalate may be replaced with calcium isophthalate, or the calcium, barium, zinc, or magnesium salts of terephthalic acid or isophthalic acid. Other divalent salts of dicarboxylic acids may be used as well.

The following examples further serve to describe the present invention.

EXAMPLE 1

Formulations A and B and a prior art formulation (P.A. form), identified in Table 1, were tested for a variety of physical properties generally required of gasket materials. The tests used are well known in the art and were conducted under standard procedures

TABLE 1
EXEMPLARY FORMULATIONS

| Form | Fiber(F) | Wt. % F | Binder (B) | Wt. % B | Wt. % Filler | Calcium (CaT) Terephthalate | Kaolin | Other* | Phenolic Resin |
|---|---|---|---|---|---|---|---|---|---|
| A | aramid/carbon (5:3 ratio) | 7.6 | nitrile butadiene rubber (NBR) | 7.7 | 82.1 | 24.6 | 32.9 | 24.6 | 2.5 |
| B | aramid/carbon (5:3 ratio) | 7.7 | NBR | 7.0 | 82.8 | 36.0 | 47.0 | 19.8 | 2.5 |
| C | aramid | 6.0 | NBR | 7.0 | 84.4 | 37.6 | 45.0 | 17.4 | 2.5 |
| D | aramid/mineral fiber (4:4 ratio) | 7.6 | NBR butyl rubber (9:1 ratio) | 7.0 | 84.4 | 37.6 | 45.0 | 17.4 | 2.5 |
| E | aramid/carbon fiber (5:3 ratio) | 7.6 | NBR silicon rubber (6:4 ratio) | 7.0 | 84.4 | 37.6 | 45.0 | 17.4 | 2.5 |
| F | aramid | 7.6 | Hydrogenated NBR | 7.0 | 84.4 | 37.6 | 45.0 | 17.4 | 2.5 |
| G | aramid | 7.6 | Carboxylated NBR | 7.0 | 84.4 | 27.6 **10.0 Znt | 45.0 | 17.4 | 2.5 |
| Prior art formulation | aramid/carbon (5:3 ratio) | 7.7 | NBR | 7.0 | 82.8 | — | 63.0 | 19.8 | 2.5 |

*These fillers include graphite, vermiculite, mica, aluminum trihydrate, and magnesium hydroxide.
**Formulation includes 10% zinc terephthalate in addition to 27.6 CaT.

The formulations presented in Table I are intended to be exemplary. Various modifications may be made to dictated by the ASTM. The tests conducted and the results obtained are illustrated below in Table 2.

TABLE 2
FORMULATION

| Test No. | Test | P.A. Form. | A | B | Sheet Density (lb/ft³) |
|---|---|---|---|---|---|
| 1. | Static Seal (in AF) (20 min. Cure) 24 H (g/24 hrs.) | — | 0.23 | 0.00 | 93 |
| 2. | Static Seal (in AF) (8 min. Cure) 24 H (g/24 hrs.) | 4.80 | 0.55 | 0.00 | 93 |
| 3. | Static Seal (in AF) 24 hrs. (g/24 hrs.) | 21.20 | 0.60 | 0.00 | 80 |
| 4. | Comp 1K psi (%) | 5.40 | 7.20 | 4.90 | 93 |
| 5. | Comp 2.5K psi (%) | 7.30 | 9.70 | 6.40 | 93 |
| 6. | Comp 5K psi (%) | 14.80 | 15.80 | 12.80 | 80 |
| 7. | Seal Fuel A (cc/hr.) | 2.25 | 1.52 | 1.90 | 93 |
| 8. | Seal Fuel A (cc/hr.) | 4.45 | 3.20 | 3.70 | 80 |
| 9. | CR Oil 50K (%) | 15.50 | 22.30 | 16.60 | 80 |
| 10. | CR AF 50K (%) | 4.60 | 4.20 | 5.70 | 80 |
| 11. | SW AF (% swell @ 200° F.) | 3.60 | — | 6.00 | 93 |
|  |  | 3.60 | 1.80 | 4.90 | 80 |
| 12. | Abs AF (% Absorption @ 200° F.) | 19.10 | — | 18.00 | 93 |
|  |  | 23.40 | 9.20 | 19.00 | 80 |
| 13. | SW Oil (% swell @ 300° F.) | 4.30 | — | 4.80 | 93 |
|  |  | 4.50 | 6.50 | 5.20 | 80 |
| 14. | Abs Oil (% absorption @ 300° F.) | 26.70 | — | 23.70 | 93 |
|  |  | 37.40 | 35.00 | 34.10 | 80 |
| 15. | Tensile Loss AF (%) | 17.30 | — | 20.80 | 93 |
|  |  | 18.80 | 18.20 | 20.40 | 80 |
| 16. | Tensile Loss Oil (%) | 18.50 | — | 27.50 | 93 |

TABLE 2-continued

| | | FORMULATION | | | |
|---|---|---|---|---|---|
| | | | Composition | | |
| Test No. | Test | P.A. Form. | A | B | Sheet Density (lb/ft³) |
| | | 24.70 | 42.40 | 33.00 | 80 |
| 17. | Tensile Str. (psi) | 1014.00 | 542.00 | 832.00 | 80 |
| 18. | Comp AF 2.5K (%) | 9.50 | — | 8.10 | 93 |
| 19. | Rec AF 2.5K (% recovery) | 60.90 | — | 52.10 | 93 |
| | | — | 46.60 | — | 80 |
| 20. | Comp Oil 5K (%) | 33.90 | 77.30 | 23.60 | 80 |
| 21. | SR 150° C. (%) | 7.20 | 9.10 | 9.00 | 80 |
| | | 6.20 | — | 7.20 | 93 |
| 22. | SR 300° C. (%) | 17.30 | 20.80 | 22.60 | 80 |

Tests 1 through 3 evaluate the sealability properties of the material. These tests measure the amount of antifreeze leakage over a specified period (g/24 hrs) at the specified temperature. These are conducted at an internal pressure at 60 psi and under a 500 psi clamp load.

The compression (tests Nos. 4 through 6) evaluate the percent compression of a dry material at the stated load.

Tests 7 and 8 measure the leakage rate of fuel A (cc/hr) through a gasket of the specified material at 1 atmosphere internal pressure and at a 500 psi clamp load.

Tests 9 and 10 measure the percent crush resistance in oil and antifreeze respectively, at 300° F. and 50,000 psi.

Tests 11 through 14 measure the percent swell in antifreeze (SW AF) and oil No. 3 (SW oil) and the percent absorption in antifreeze (Abs AF) and oil (Abs oil). The antifreeze tests are conducted in an antifreeze/water mixture (1:1 ratio) at 200° F. and the oil tests are conducted in No. 3 oil at 300° F.

Tests 15 and 16 evaluate the percent tensile lost in antifreeze (AF) and in oil after heating in AF at 200° F. and in oil at 300° F. for 5 hours.

Test 18 evaluates the percent compression at 2500 psi of the material after heating at 200° F. in an antifreeze/water mixture (1:1 ratio) for 1 hour. Test 20 evaluates the percent compression at 5000 psi of the material after heating in oil for 5 hours at 300° F.

Test 19 measures the percent recovery from compression at 2500 psi after heating in an antifreeze/water mixture (1:1 ratio) for 1 hour.

Tests 21 and 22 measure the stress relaxation over 22 hours at 150° C. and 300° C., respectively.

It is understood that various modifications may be made to the invention described herein without departing from the scope of the invention.

What is claimed is:

1. A gasket composition, comprising:
   a fibrillated or nonfibrillated fiber component, having thermal stability at temperatures at least as high as 200° C., and selected from the group consisting of natural fibers, carbon fibers, synthetic fibers and mineral fibers;
   a filler component wherein at least 20 percent by weight of the filler comprises a salt of a multivalent metal cation and a sterically hindered dicarboxylic acid; and
   an elastomeric binder component,
   the gasket material demonstrating good sealability properties and a thermal stability at temperatures at least as high at 250° C.

2. The composition of claim 1 wherein the fiber component is selected from the group of consisting of cellulosics, polyamides, polyaramids, acrylics, polyesters, polybenzimidazole, polyphenylene sulfide, polyimides, mineral fibers, carbon fibers, and mixtures thereof.

3. The composition of claim 2 wherein the fiber component comprises 3 to 15 percent by weight of the composition.

4. The composition of claim 1 wherein the metal cations are divalent and are selected from the group consisting of barium, cadmium, calcium, cobalt, magnesium, lead, nickel, strontium and zinc.

5. The composition of claim 4 wherein the hindered dicarboxylic acids are selected from the group consisting of terephthalic acid and isophthalic acid, tetrafluoro terephthalic acid, and 1,4-dicarboxy napthalene.

6. The composition of claim 5 wherein the filler component further comprises solids selected from the group consisting of attapulgates, clays, kaolins, talcs, magnesium hydroxide, alumina, mica, graphite, diatomaceous earths, aluminum trihydrate, zinc borate, and mixtures thereof.

7. The composition of claim 6 wherein the filler component comprises about 60 to 90% by weight of the composition.

8. The composition of claim 7, wherein the salt of the filler component is present at about 20 to 80% by weight of the filler component.

9. The composition of claim 2 wherein the binder component is present at about 3 to 15 percent by weight of the composition.

10. The composition of claim 9 wherein the binder is an elastomeric material selected from the group consisting of ABS rubbers, nitrile butadiene rubbers, hydrogenated nitrile butadiene rubbers, carboxylated nitrile butadiene rubbers, styrene butadiene rubbers, polyisoprene rubber, natural rubbers, butyl rubber, EPDM, polybutadiene rubbers, acrylic rubbers, and silicone rubbers.

11. The composition of claim 2 further comprising a polymeric material selected from the group consisting of epoxy resin and phenolic resin, present at up to 5% by weight.

12. The composition of claim 11, further comprising a silicone resin present at up to 5% by weight.

13. A composite gasket material having relatively high thermal stability, comprising
   a fibrillated fiber component, present at about 3 to 15 percent by weight of the total composition;
   an elastomeric binder composition, present at about 3 to 15 percent by weight of the total composition;
   a filler component, present at about 70 to 90 percent by weight of the total composition, wherein at least 30 percent by weight of the filler comprises a salt of a divalent metal and a hindered dicarboxylic acid where the divalent metal is selected from the group consisting of barium, calcium, magnesium and zinc and the hindered dicarboxylic acid is selected from the group consisting of terephthalic acid and isophthalic acid, tetrafluoro terephthalic acid, and 1,4 dicarboxy napthalene;

a phenolic or epoxy resin present at up to 5% by weight; and a silicone resin present at up to 5% by weight.

14. The material of claim 13 wherein the fiber component is selected from the group consisting of cellulosics, polyamides, polyaramids, polyesters, acrylics, polyimides, polybenzimidazole, polyphenylene sulfide, carbon fibers, glass fibers, ceramic fibers, and mixtures thereof.

15. The material of claim 14 wherein the elastomeric binders are selected from the group consisting of nitrile butadiene rubbers, hydrogenated nitrile butadiene rubbers, carboxylated nitrile butadiene rubbers, acrylic rubbers, silicone rubbers, butyl rubber, EPDM, styrene butadiene rubbers, polyisoprene rubbers, natural rubbers, and polybutadiene rubbers.

16. The material of claim 15 wherein the gasket material is able to provide sealing properties and to withstand thermal degradation at temperatures up to about 450° C.

17. The material of claim 13 having resistance to degradation by oils, fuels, alcohols and diols.

* * * * *